United States Patent [19]

Hamoto et al.

[11] 4,144,293
[45] Mar. 13, 1979

[54] WHIPPED CREAM MAKING MACHINE

[75] Inventors: Hideaki Hamoto, Yamatokoriyama; Masao Ogino, Sakai; Mitsunobu Yoshida, Tenri; Yoshinari Mishima, Tenri; Akiho Yoshizawa, Osaka, all of Japan

[73] Assignees: Kabushiki Kaisha Takarabune, Kyoto; Sharp Kabushiki Kaisha, Osaka, both of Japan

[21] Appl. No.: 836,716

[22] Filed: Sep. 26, 1977

[30] Foreign Application Priority Data

Sep. 30, 1976 [JP] Japan ................................ 51-117965
Oct. 28, 1976 [JP] Japan ................................ 51-130158
Mar. 30, 1977 [JP] Japan ............................ 52-39447[U]

[51] Int. Cl.² ............................................ B01F 3/04
[52] U.S. Cl. .................................... 261/93; 99/485;
261/18 B; 261/140 R; 261/DIG. 16; 366/290; 426/474; 426/519
[58] Field of Search ............... 261/93, 18 B, DIG. 16, 261/DIG. 26, 140 R; 99/485; 366/102, 279, 290, 292, 305, 325; 426/474, 519

[56] References Cited

U.S. PATENT DOCUMENTS

| | | | |
|---|---|---|---|
| 2,191,450 | 2/1940 | Campbell | 366/102 |
| 2,507,477 | 5/1950 | MacDonald et al. | 426/519 X |
| 3,155,472 | 11/1964 | Huppke | 261/DIG. 26 |
| 3,317,198 | 5/1967 | Phelan et al. | 261/DIG. 16 |
| 3,563,399 | 2/1971 | Shivers | 366/292 X |
| 3,758,080 | 9/1973 | MacManus | 261/DIG. 16 |
| 4,055,673 | 10/1977 | Mueller et al. | 426/519 X |

FOREIGN PATENT DOCUMENTS

4636186 10/1971 Japan .............................. 261/DIG. 16

*Primary Examiner*—Richard L. Chiesa
*Attorney, Agent, or Firm*—Birch, Stewart, Kolasch and Birch

[57] ABSTRACT

A machine for making an emulsified product from a mixture of a gas and a liquid milk product capable of forming a foam which comprises a fixed whipping barrel, having a substantially labyrinth passage defined therein, and to which the liquid milk product, after having sucked by and mixed with the gas in a suction pump, is supplied under pressure. The liquid milk product mixed with air is emulsified as it flows through the labyrinth passage in the fixed whipping barrel and then supplied towards a rotary whipping barrel having therein a stirring rod rotatable about its longitudinal axis. The emulsified milk product is, during its passage through the rotary whipping barrel, stirred by the rotary stirring rod so that it can be further emulsified to provide a highly homogenized emulsion which is subsequently discharged from a dispenser.

7 Claims, 9 Drawing Figures

WHIPPED CREAM MAKING MACHINE

BACKGROUND OF THE INVENTION

The present invention generally relates to a machine for making emulsified or foam products from a mixture of a gas and a milk product capable of forming a foam and, more particularly, to a machine for making whipped cream.

It is generally well known that whipped cream can be manufactured by forcing air and cream simultaneously through a whipping means having such a large surface area of contact as to provide substantial agitation and intimate intermingling of the air and the cream.

According to the Japanese Patent Publication No. 46-36186, published on Oct. 23, 1971 and first applied for patent in Italy on Nov. 20, 1967 and July 8, 1968 under respective Italian patent applications Nos. 7442A/67 and 7152A/68, there is disclosed a whipped cream making machine which comprises a refrigerator-cooled cream tank and an emulsifying or whipping barrel to which cream within the cream tank is supplied under pressure by means of a gear pump after it has been intermingled with air during the passage thereof through the gear pump. The emulsifying barrel comprises a hollow cylindrical shell having an emulsifying chamber in which an elongated deflector assembly generally complemental in shape to the shape of the emulsifying chamber is accommodated. The deflector assembly is so designed as to provide a substantially labyrinth passage through which the mixture of air and cream flows in a substantially zig-zag manner. It is during the flow through the labyrinth passage that the air and the cream are agitated and intermingled to form an emulsion of air and cream which ultimately emerges outside of the machine in the form of a whipped cream from a dispensing spout coupled to the emulsifying barrel through a dispensing valve assembly.

The prior art whipped cream making machine is satisfactory in that whipped cream can be manufactured. However, it has been found that, since the extent to which the air and the cream are agitated and intermingled is insufficient, they tend to be insufficiently homogenized, the consequence of which is that not only does the resultant whipped cream occasionally bubble out from the dispensing spout during discharge thereof, but also the resultant whipped cream contains relatively large and irregular bubbles.

Moreover, in the prior art whipped cream making machine, since the dispensing valve assembly is so designed that, when a manipulatable handle is pivoted in one direction, a power control switch is turned on to energize an electric motor to drive the gear pump coupled to said motor through an endless belt on one hand and the dispensing valve is opened to permit the emulsion to be supplied towards the dispensing spout, there is the possibility that, even when the manipulatable handle is returned back to the original position with the power control switch turned off and with the dispensing valve closed, the emulsion within the emulsifying barrel is so highly pressurized by the continued rotation of the motor under the influence of an inertia force that a portion of the emulsion within the emulsifying barrel can be squeezed out through the dispensing valve to leak to the outside of the machine for a substantial period of time subsequent to the closure of the dispensing valve. This in turn results in waste of an expensive milk product.

SUMMARY OF THE INVENTION

Accordingly, the present invention has been made with a view to substantially eliminating the disadvantages and inconveniences inherent in the prior art whipped cream making machine of the construction described above and is intended to provide an improved version of whipped cream making machine capable of making whipped cream from a homogenized emulsion of gas and milk product.

These and other objects and further scope of applicability of the present invention will become apparent from the detailed description given hereinafter; it should be understood, however, that the detailed description and accompanying specific drawings, while indicating preferred embodiments of the instant invention, are given by way of illustration only, since various changes and modifications within the spirit and scope of the invention will become apparent to those skilled in the art from the detailed description and such changes and modifications should be considered to be within the scope of this invention.

According to the present invention, a whipped cream making machine comprises a refrigerator-cooled cream tank from which cream is, after having been pumped by a gear pump and intermingled with air introduced through the gear pump, supplied under pressure towards a fixed whipping barrel having a substantially labyrinth passage defined therein. During the passage of the cream mixed with the air through the labyrinth passage in the fixed whipping barrel, they are agitated and intermingled to form an emulsion of cream and air which is in turn supplied under pressure towards a rotary whipping barrel. The rotary whipping barrel comprises a hollow cylinder having one end in communication with the fixed whipping barrel and the other end in communication with a dispensing spout through an electromagnetically operated dispensing valve, and a stirring rod housed within the hollow cylinder for rotation about its own longitudinal axis.

In the whipped cream making machine of the present invention, since the emulsion of cream and air which has emerged from the fixed whipping barrel is again agitated and intermingled by the rotating stirring rod as it flows under pressure through the rotary whipping barrel, a finely homogenized whipped cream can be available from the dispensing spout.

BRIEF DESCRIPTION OF THE DRAWINGS

The features of the present invention will become more fully apparent from the following description taken in conjunction with preferred embodiments thereof with reference to the accompanying drawings which are given by way of illustration only, and thus are not limitative of the present invention, in which.

DETAILED DESCRIPTION OF THE INVENTION

Figure 1:
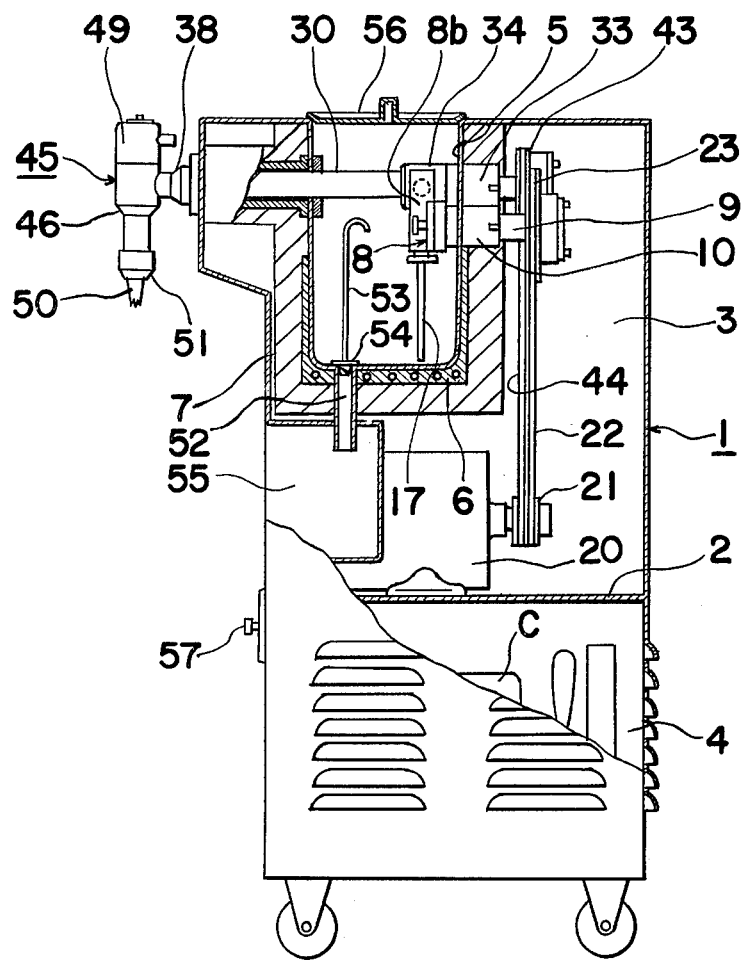
FIG. 1 is a side sectional view of a whipped cream making machine according to one preferred embodiment of the present invention.

Before the description of the present invention proceeds, it is to be noted that like parts are designated by like reference numerals throughout the accompanying drawings.

Referring now to FIGS. 1 to 6, a whipped cream making machine comprises a housing structure 1 divided by a partition wall 2 into upper and lower compartments 3 and 4. Within the upper compartment 3, a cream tank 5 is supported firmly in position in any known manner and has its top opening upwards. An evaporator 6, shown in the form of a cooling coil, is arranged externally of the bottom of the cream tank 5 and is operatively coupled to a compressor C as is well known to those skilled in the art.

In the construction so far described, the cream tank 5 is cooled by a cooling medium flowing in a circulating path including the evaporator 6 and the compressor C. Such a cooling system is well known and may be of any known construction and, therefore, the details thereof are herein omitted.

Surrounding externally of the cream tank 5 except for the top opening of the tank 5 is a heat insulating layer 7, the purpose for which it is employed being well known to those skilled in the art.

The whipped cream making machine further comprises a suction pump 8 which is generally employed in the form of a gear pump because of its excellent performance in imparting a smooth flow of cream being sucked from the cream tank 5 with no cavitation being substantially formed in the cream. This suction pump 8 has a drive shaft 9 and is positioned within the cream tank 5 with its drive shaft 9 rotatably supported by a bearing sleeve 10 in a watertight manner, said bearing sleeve 10 extending completely through the heat insulating layer 7 in parallel relation to the plane of the bottom of the cream tank 5.

Figure 3:
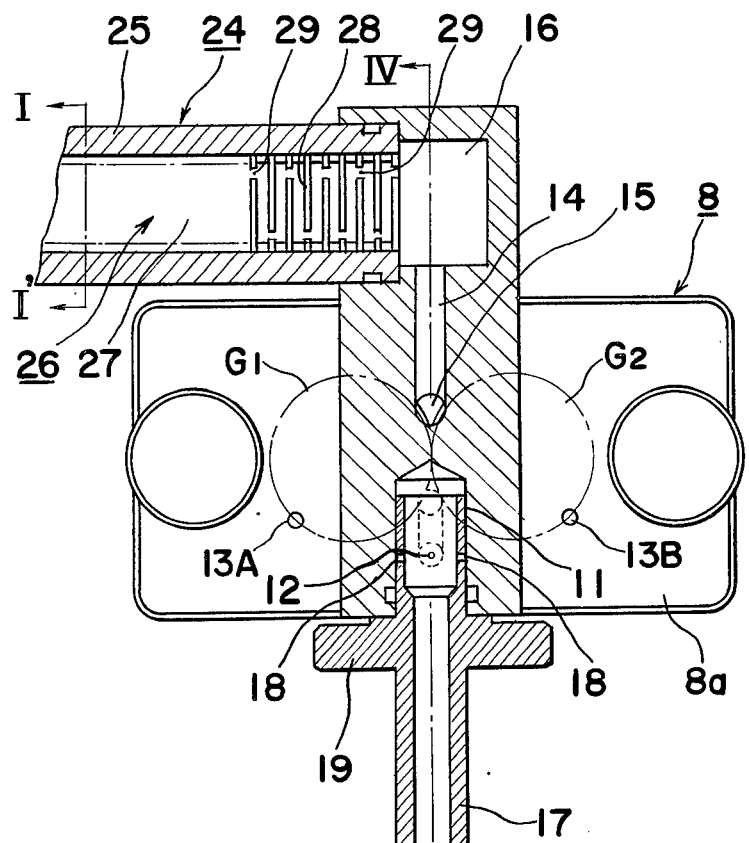
FIG. 3 is a front sectional view showing the details of connection between a suction pipe and a fixed whipping barrel through a gear pump in the machine shown in FIG.
Figure 4:
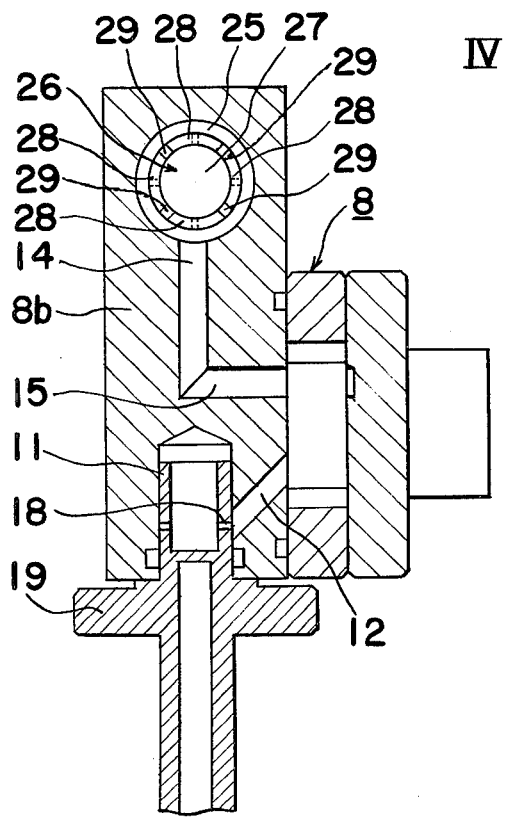
FIG. 4 is a cross sectional view taken along the line IV—IV in FIG. 3.

As best shown in FIGS. 3 and 4, the suction pump 8 includes a pair of gears $G_1$ and $G_2$ operatively housed in a housing 8a in a known manner. The pump housing 8a has a substantially elongated block 8b rigidly secured thereto. The block 8b is formed at its one end with an axially extending suction bore 11 and an inlet passage 12 through which said suction bore 11 is in communication with an inlet port formed in the pump housng 8a. It is to be noted that one end of the inlet passage 12 remote from the inlet port of the suction pump 8 opens towards the suction bore 11 and is positioned substantially intermediately of the depth of the suction bore 11. The block 8b is also formed at the other end thereof with a supply bore 16, extending at right angles to the longitudinal axis of the block 8b, and a supply passage 14 through which said supply bore 16 is communicated to a discharge port 15 formed in the pump housing 8a.

The pump housing 8a has a pair of air intake ports 13A and 13B positioned on respective sides of the block 8b for the introduction of air to be mixed with cream being pumped as will be described later.

Extending downwards from the suction bore 11 is a suction pipe 17 havng one end positioned adjacent the bottom of the cream tank 5 and the other end tightly, but rotatably, fitted into the suction bore 11. This suction pipe 17 has a plurality of angularly equally spaced holes 18 of different diameters radially extending completely through the wall of the suction pipe 17 and formed in said suction pipe 17 adjacent said other end thereof, any one of said holes 18 being selectively communicated to and aligned with the open end of the suction passage 12 upon rotation of said suction pipe 17. These holes 18 in the suction pipe 17 and the open end of the suction passage 12 communicable to any one of the holes 18 upon rotation of the suction pipe 17 cooperate to each other to serve as a flow regulator by which the amount of cream to be sucked into the suction pump 8 can be regulated.

The suction pipe 17 is shown to have a radially outwardly extending collar 19, the outer peripheral face of which may have indicia (not shown) equal in number to the number of the holes 18 to show the position of any one of the holes 18 relative to the open end of the suction passage 12 in cooperation of an index marking (not shown) provided on the block 8b. It is readily be seen that, by aligning any one of the indicia on the outer peripheral face of the collar 19 with the index marking on the block 8b, the hole 18 of a particular diameter specified by the position of such any one of the indicia relative to the index marking can be aligned with the open end of the suction passage 12.

In the construction so far described above, it is clear that, during operation of the suction pump 8, cream within the cream tank 5 can be supplied from the suction pipe 17 towards the supply bore 16 by way of the suction pump 8 and that, during the flow of the cream through the suction pump 8, the cream being pumped is mixed with air introduced into the suction pump 8 through the air intake ports 13A and 13B.

For driving the drive shaft 9 of the suction pump 8, there is employed a drive mechanism. In the embodiment shown in FIGS. 1 to 6, the drive mechanism comprises an electrically operated motor 20 rigidly mounted on the partition wall 2 and having a drive shaft on which a drive pulley 21 is rigidly mounted. Rotation of the drive shaft of the motor 20 can be transmitted to the drive shaft 9 of the suction pump 8 through an endless belt 22 trained over the drive pulley 21 and a driven pulley 23 rigidly mounted on the drive shaft 9 of the suction pump 8.

Figure 5:
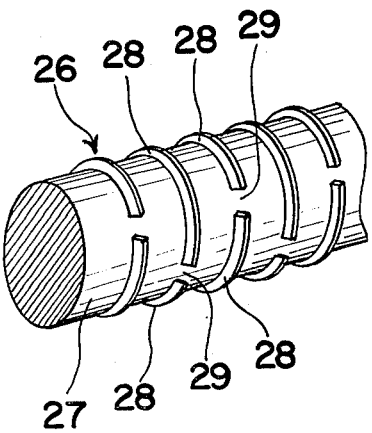
FIG. 5 is a perspective view showing a portion of an elongated deflector assembly housed in the fixed whipping barrel in the machine shown in FIG. 1, said deflector assembly portion being somewhat exaggerated.

As best shown in FIGS. 2 to 5, extending outwards from the supply bore 16 in the block 8b in a direction perpendicular to the longitudinal axis of the elongated block 8b and parallel to the plane of one of side walls forming the cream tank 5 is a fixed whipping barrel 24 which has one end tightly received by the supply bore 16 and the other end coupled to a rotary whipping barrel 30 in a manner as will be described later. The fixed whipping barrel 24 comprises a hollow cylindrical shell 25 and a deflector assembly 26 inserted within the hollow of the shell 25, said deflector assembly 26 being composed of an elongated core 27 and a plurality of annular deflectors 28 rigidly mounted on the core 27 in equally spaced relation to each other over the entire length of said core 27 and radially outwardly extending from said core 27. Each of the annular deflectors 28 has a plurality of, for example, four as best shown in FIG. 4, cutouts 29 spaced a predetermined distance from each other. As best shown in FIG. 5, the annular deflectors 28 on the core 27 are so arranged that the cutouts 29 in any one of the annular deflectors 28 assume an angularly displaced relation to the cutouts 29 in the next succeeding annular deflector 28. By way of example, assuming that the number of the cutouts 29 in each annular deflector 28 is four as can readily be seen from FIG. 4, the four cutouts 29 in any one of the annular deflectors 28 are 45° spaced about the longitudinal axis of the core 27 from the cutouts 29 in the next succeeding annular deflector 28. It is to be noted that, instead of the employment of the cutouts 29 in each annular deflector 28, each of the annular deflectors 28 may be constituted by a plurality of deflector segments rigidly mounted on the core 27 in equally spaced relation to each other in a circumferential direction of the core 27, each spacing between every adjacent two of the deflector segments corresponding in function to the cutout 29.

Figure 2:
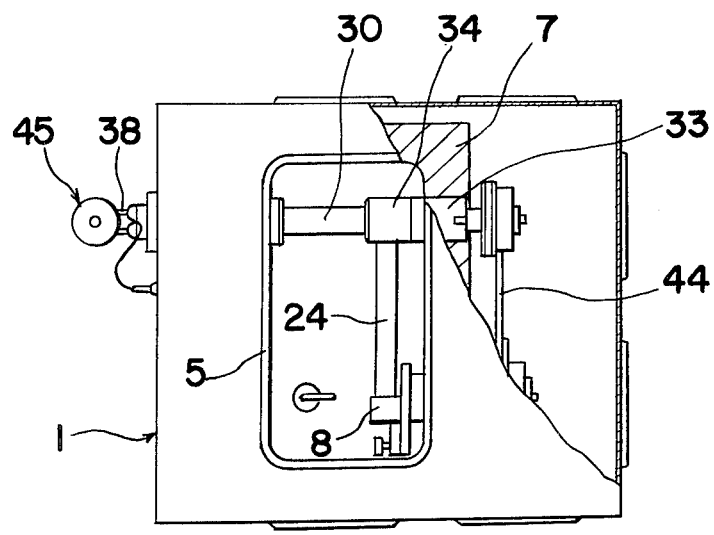
FIG. 2 is a top plan view, with a portion broken away and a tank cover removed, of the whipped cream making machine shown in FIG. 1.
Figure 6:
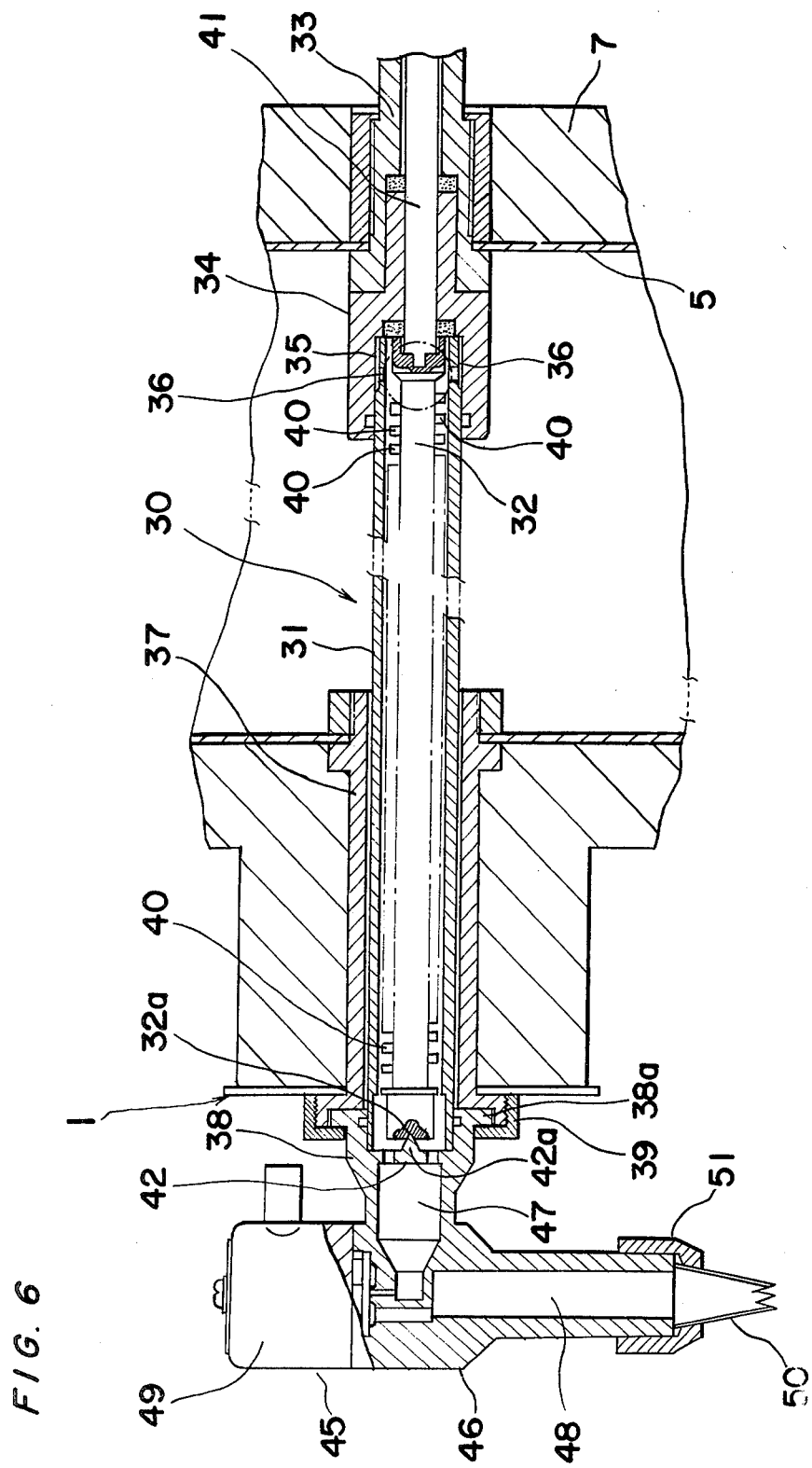
FIG. 6 is a longitudinal sectional view, on an enlarged scale, showing the details of a rotary whipping barrel and a dispensing valve employed in the machine shown in FIG. 1.

As best shown in FIGS. 2 and 6, the rotary whipping barrel 30 frontwardly extends at right angles to the fixed whipping barrel 24 and comprises a hollow cylindrical shell 31 and a stirring rod 32 rotatably inserted within the hollow of the shell 31. The cylindrical shell 31 has one end rigidly connected to a coupler 34 which has one end formed with a bearing hole 35, into which said one end of said shell 31 is tightly inserted, and the other end rigidly received by a bearing sleeve 33 extending completely through the insulating layer 7 in parallel relation to the bearing sleeve 10. The coupler 34 has a connection bore 36 defined therein and held in communication with the bearing hole 35, the other end of the cylindrical shell 25 of the fixed whipping barrel 24 remote from the block 8b being inserted tightly into said connection bore 36.

For rotating the stirring rod 32 about its longitudinal axis within the cylindrical shell 31, a drive shaft 41 rotatably extends through the bearing sleeve 33 and then the coupler 34 and connected to one end of the stirring rod 32 by a known spline engagement within the bearing hole 35 as best shown in FIG. 6. An outer end of the drive shaft 41 remote from the spline engagement between it and the stirring rod 32 has a driven pulley 43 rigidly mounted thereon and operatively coupled to the drive pulley 21 on the motor drive shaft by means of an endless belt 44 as shown in FIG. 1.

As best shown in FIG. 6, the other end of the cylindrical shell 31 of the rotary whipping barrel 30 tightly extends through a bering sleeve 37, which extends between one of the side walls of the cream tank 5 and a front panel of the housing structure 1, and terminates outside the housing structure 1.

A dispenser assembly 45 comprises a hollow cylinder 46 having a dispensing passage 48 defined therein and an electromagnetically operated dispensing valve assembly 49 rigidly mounted on the cylinder 46. The cylinder 46 has a lateral projection 38 having an intake passage 47 defined therein, an outer free end of said lateral projection 38 being formed with a radially outwardly extending flange 38a. This dispenser assembly 45 is carried by the housing structure 1 with the flange 38a engaged to and received by the outer flanged end of the bearing sleeve 37 while a substantially annular fastening member 39 mounted on the lateral projection 38 is threaded externally of the flanged end of the bearing sleeve 37 as shown in FIG. 6.

While the dispenser assembly 45 is so mounted, the end of the stirring rod 32 remote from the drive shaft 41 is supported by a spider-shaped bearing plate 42 situated within the intake passage 47 and having an outwardly tapering projection 42a received in a mating recess 32a defined in the end face of the stirring rod 32.

The electromagnetically operated dispensing valve assembly 49 may be of any known construction and is so operatively associated with a timer 57 that, only during a period of time set in the timer 57, an electromagnetic coil or solenoid (not shown) forming a part of the electromagnetically operated dispensing valve assembly 49 can be energized to establish communication between the intake passage 47 and the dispensing passage 48. The timer 57 is in turn so operatively associated with the motor 20 that, simultaneously with the setting of the timer 57 to a desired time interval during which the resultant whipped cream is discharged from a dispensing nozzle 50 secured to the cylinder 46 by means of a threaded coupler 51 in alignment with the dispensing passage 48, an electric power can be supplied to the motor 20 to drive the latter, the supply of the electric power to the motor 20 being interrupted automatically upon expiration of the time set in the timer 57.

Referring back to FIG. 6, the stirring rod 32 has a plurality of stirring elements rigidly mounted thereon or otherwise integrally formed therewith. Each of these stirring elements is, in the embodiment shown in FIGS. 1 to 6, composed of a row of stirring blades or projections 40, said row extending axially of the rod 32, each of said stirring blades 40 radially outwardly extending at right angles to the longitudinal axis of said rod 32.

Figure 7:
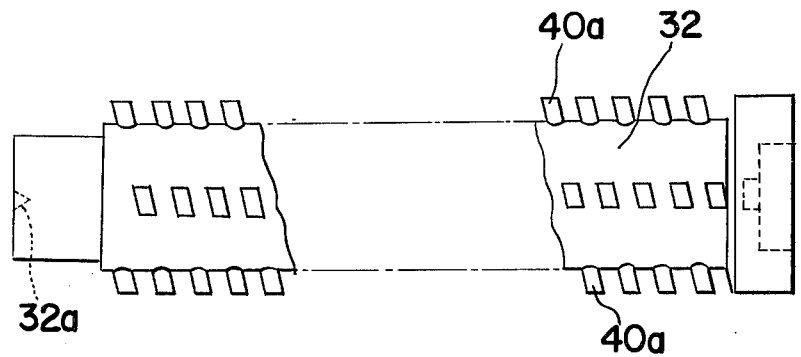
FIG. 7 is a longitudinal elevational view showing a modified form of a stirring rod operatively housed in the rotary whipping barrel.
Figure 8:
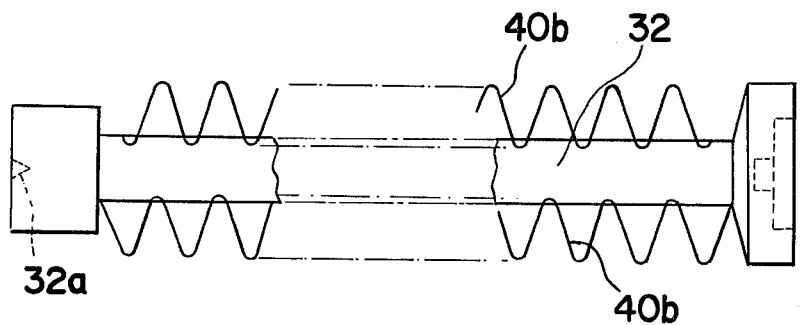
FIG. 8 is a view similar to FIG. 7, showing another modified form of the stirring rod within the rotary whipping barrel.

Alternatively, as best shown in FIG. 7, each of the stirring elements may be composed of a row of stirring blades or projections 40a, said row extending axially of the stirring rod 32, each of said stirring blades 40a radially outwardly extending from the rod 32 and being inclined at a certain angle relative to the longitudinal axis of the rod 32. Moreover, as best shown in FIG. 8, each of the stirring elements may be composed of a corrugated wire 40b extending axially of the stirring rod 32.

In any event, the stirring elements on the rod 32 are so designed that, during rotation of the stirring rod 32 about its own longitudinal axis, they do not substantially participate in the flow of an emulsion, as will be described later, from the connection bore 36 in the coupler 34 towards the dispenser assembly 45.

Referring back to FIG. 1, for discharging the cream within the cream tank 5, a discharge tube 52 is provided. The discharge tube 52 has one end opening at the bottom of the tank 5 and the other end in communication with a depositary 55 inwardly recessed in the housing structure 1 and adapted to receive therein any suitable receptacle or container for accommodating therein the discharged cream. The opening on the bottom of the cream tank 5 leading to the discharge tube 52 is normally closed by a closure member 54 having an elongated pull rod 53 accessible to the hand of an operator of the whipped cream making machine, which pull rod 53 is outwardly pulled to remove the closure member 54 when the cream within the cream tank 5 is desired to be discharged through the tube 52. Reference numeral 56 represents a top cover adapted to cover the top opening of the cream tank 5.

The whipped cream making machine of the construction described above operates as follows.

Assuming that a predetermined amount of cream is accommodated within the cream tank 5 and a power supply switch is turned on simultaneously with the setting of the timer 57 to energize the motor 20, the suction pump 8 is operated to suck the cream into the suction pipe 17. The cream so sucked into the suction pipe 17 is drawn into a gear chamber of the suction pump 8 through a selected one of the holes 18 by way of the suction passage 12. As the cream flows through the gear chamber of the suction pump 8, the cream is mixed with air introduced into the gear chamber of the suction pump 8 through the air intake ports 13A and 13B and the resultant mixture of cream and air is then supplied under pressure towards the supply bore 16 through the supply passage 14. It is to be noted that selection of any one of the holes 18 to be aligned with the open end of the suction passage 12 in the block 8b is effected in consideration of the amount of air introduced into the suction pump chamber through the air intake ports 13A and 13B so that cream and air can be mixed in a proper mixing ratio.

The cream so supplied to the supply bore 16 in the block 8b under pressure is then introduced into the fixed whipping barrel 24 and flows towards the coupler 34, travelling in a substantially zig-zag manner through a substantially labyrinth passage defined by the deflectors 28 in cooperation with the cutouts 29 within an axially extending annular space between the inner peripheral surface of the shell 25 and the peripheral surface of the core 27. During the zig-zag travel of the mixture of air and cream within the fixed whipping barrel, such mixture undergoes substantial alternate acceleration and deceleration and is, therefore, homogenized to provide an emulsion of cream and air.

The emulsion so produced is deflected within the coupler 34 towards the rotary whipping barrel 30. Since the stirring rod 32 is rotated about its own longitudinal axis, the emulsion is further whipped as it travels from the coupler 34 towards the intake passage 47 in the dispenser assembly 45.

Since simultaneously with the setting of the timer 57 the electromagnetic coil of the electromagnetically operated dispensing valve assembly 49 is energized to establish the communication between the intake passage 47 and the dispensing passage 48, the emulsion supplied under pressure to the intake passage 47 can be discharged from the dispensing nozzle 50 through the dispensing passage 48 in the form of a finely whipped cream. This discharge of the whipped cream continues during the time set in the timer 57. However, upon expiration of the time set in the timer 57, not only can the motor 20 be deenergized, but also the electromagnetic coil of the valve assembly 49 can be deenergized.

In order that the discharge of the whipped cream from the nozzle 50 can readily be interrupted incident to expiration of the time set in the timer 57, the motor 20 is preferably of a type having an electromagnetic brake system operable to interrupt the rotation of the motor drive shaft simultaneously with the expiration of the time set in the timer 57.

Alternatively, in addition to the motor 20, the drive mechanism may include an electric control circuit capable of generating and applying a pulse of D.C. voltage to the motor 20 to instantaneously stop rotation of the motor drive shaft. Moreover, an electromagnetically operated clutch mechanism may be disposed between the drive shaft of the motor 20 and the pulley 21.

Figure 9:
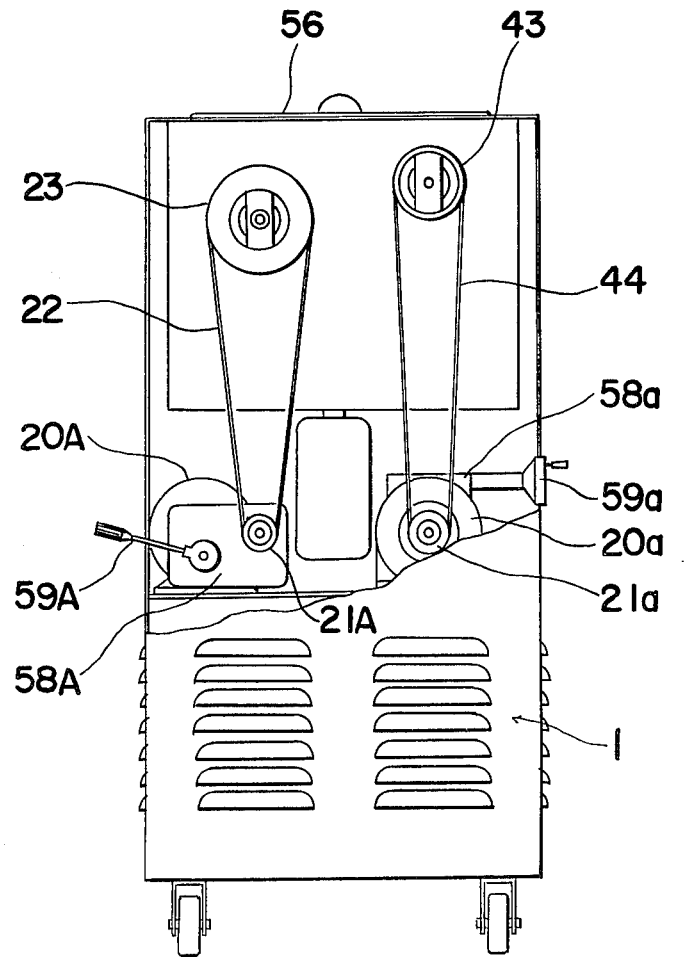
FIG. 9 is a rear view, with a portion broken away, of the whipped cream making machine according to another preferred embodiment of the present invention.

In the embodiment shown in FIG. 9, the drive mechanism employed in the embodiment of FIG. 9 differs from that employed in the embodiment of FIGS. 1 to 6. The drive mechanism shown comprises separate motors 20A and 20a respectively associated with the suction pump 8 and the rotary whipping barrel 30, and separate speed changers 58A and 58a operatively coupled to the motors 20A and 20a respectively. While the pulley 21 employed in the embodiment of FIGS. 1 to 6 is of a type having a pair of grooves one for the support of the belt 22 and the other for the support of the belt 44, separate pulleys are employed in the embodiment of FIG. 9 as shown by 21A and 21a. These separate pulleys 21A and 21a are respectively rigidly mounted on the drive shafts of the motors 20A and 20a and around which the endless belts 22 and 44 are trained.

Each of the speed changers 58A and 58a may be of any known construction and has a manipulatable handle 59A or 59a. It will readily be seen that by manipulating one or both of the handles 59A and 59a the speed of rotation of one or both of the motors 20a and 20a can be selected as desired.

Although the present invention has fully been described by way of the preferred embodiments thereof with reference to the accompanying drawings, it is to be noted that various changes and modifications are apparent to those skilled in the art. By way of example, the dispenser assembly 45 may not be always limited to the construction such as shown, but may be of a construction such as disclosed in the above described Japanese Patent Publication, in which case the timer 57 may be omitted.

Therefore, such changes and modifications are, unless they depart from the true scope of the present invention, to be construed as included therein.

We claim:

1. A machine for introducing a gas into a liquid milk product capable of forming a foam, which comprises, in combination:
   a housing structure including a container for accommodating a predetermined amount of liquid milk product;
   a suction pump having a mixing chamber, a suction port in communication with said container and leading into the mixing chamber, a discharge port in communication with the mixing chamber and intake port means through which the gas is introduced into the mixing chamber, said suction pump being operable to mix the liquid milk product, sucked into the mixing chamber through the suction port, with the gas introduced into the mixing chamber through the intake port means and then to supply the resulant mixture under pressure towards the discharge port;
   a first whipping barrel having one end coupled to the discharge port of the suction pump, said first whipping barrel having a substantially labyrinth passage defined therein, said mixture of gas and liquid milk product, which has been supplied under pressure into the first whipping barrel, being emulsified during its passage through the substantially labyrinth passage;
   a second whipping barrel having one end coupled to the other end of the first whipping barrel, said second whipping barrel having therein means for stirring the emulsified mixture during the passage of the latter therethrough;

means including a shut-off valve for dispensing the emulsified mixture, which has been supplied under pressure towards the other end of the second whipping barrel, to the outside of the housing structure during the opening of said shut-off valve; and a drive mechanism for driving the suction pump and also for driving said stirring means in the second whipping barrel.

2. A machine as claimed in claim 1, wherein said gas, liquid milk product and emulsified product are respectively air, cream and whipped cream.

3. A machine as claimed in claim 1, wherein said second whipping barrel is in the form of a hollow cylindrical shell and said stirring means comprises a stirring rod rotatably extending in the hollow of said cylindrical shell, said second whipping barrel extending at right angles to the first whipping barrel.

4. A machine for introducing a gas into a liquid milk product capable of forming a foam which comprises, in combination:

a housing structure including a container for accommodating a predetermined amount of liquid milk produce;

a suction pump having a mixing chamber, a suction port in communication with said container and leading into the mixing chamber, a discharge port in communication with the mixing chamber and intake port means through which the gas is introduced into the mixing chamber, said suction pump being operable to mix the liquid milk product, sucked into the mixing chamber through the suction port, with the gas introduced into the mixing chamber through the intake port means and then to supply the resultant mixture under pressure towards the discharge port;

a first whipping barrel having one end coupled to the discharge port of the suction pump, said first whipping barrel having a substantially labyrinth passage defined therein, said mixture of gas and liquid milk product, which has been supplied under pressure into the first whipping barrel, being emulsified during its passage through the substantially labyrinth passage;

a second whipping barrel in the form of a hollow cylindrical shell having one end coupled to the other end of the first whipping barrel, said second whipping barrel having therein means for stirring the emulsified mixture during the passage of the latter therethrough, said stirring means comprising a stirring rod rotatably extended in the hollow of said cylindrical shell, said second whipping barrel extending at right angles to the first whipping barrel, and a coupling means for connecting the other end of the first whipping barrel to said one end of the second whipping barrel in fluid-communicated relation, one end of said stirring rod remote from the dispensing means rotatably extending through said coupling means and terminating outside of the container, and wherein said drive mechanism comprises an electrically operated motor having a drive shaft, a drive pulley rigidly mounted on said motor drive shaft, a driven pulley rigidly mounted on said one end of said stirring rod and an endless belt suspended between said drive and driven pulleys 5. A machine as claimed in claim 4, wherein said drive mechanism comprises an additional electrically operated motor having a drive shaft, an additional drive pulley rigidly mounted on the drive shaft of said additional motor, an additional driven pulley rigidly mounted on a drive shaft of the suction pump, and an endless belt suspended between said additional drive and driven pulleys for driving the suction pump.

6. A machine as claimed in claim 5, wherein said drive mechanism further comprises a speed changer for controlling the speed of rotation of said additional motor.

7. A machine as claimed in claim 4, wherein said drive mechanism further comprises a speed changer for controlling the speed of rotation of said motor.

* * * * *